United States Patent [19]
Talas

[11] Patent Number: 5,161,899
[45] Date of Patent: Nov. 10, 1992

[54] BEARING ASSEMBLY FOR SHAFTS, PARTICULARLY EXPANDING SHAFTS OF WINDING MACHINES

[75] Inventor: Matyas Talas, Bad Iburg, Fed. Rep. of Germany

[73] Assignee: Firma Vorwald GmbH & Co., KG, Hilter, Fed. Rep. of Germany

[21] Appl. No.: 736,661

[22] Filed: Jul. 26, 1991

[30] Foreign Application Priority Data

May 3, 1991 [DE] Fed. Rep. of Germany ... 9105487[U]

[51] Int. Cl.⁵ .............................................. F16C 19/18
[52] U.S. Cl. ..................... 384/99; 384/556; 384/584
[58] Field of Search ............. 384/99, 584, 624, 571, 384/581, 556, 537

[56] References Cited

U.S. PATENT DOCUMENTS

| | | | |
|---|---|---|---|
| 2,565,759 | 8/1951 | Danly et al. | 384/556 |
| 4,286,830 | 9/1981 | Salter | 384/584 |
| 4,551,032 | 11/1985 | Mottershead | 384/556 |
| 4,882,950 | 11/1989 | Gausrab et al. | 384/571 |

Primary Examiner—Lenard A. Footland
Attorney, Agent, or Firm—Jordan and Hamburg

[57] ABSTRACT

A bearing assembly supporting a support shaft to which a coupling shaft is to be coupled includes a bearing box (4) rotatably supporting a support shaft (5). A receiving part (12) is connected to the support shaft. The receiving part (12) has a profile pocket (15) having an axial access opening (16) and a peripheral access opening (17) for receiving a coupling shaft to be coupled to the support shaft (5). A protective housing (26) is disposed about the receiving part (12), and a locking part (13) is disposed between the receiving part (12) and the protective housing (26). The support shaft (5) has an exchange position to which the support shaft (5) is rotated to provide for exchanging coupling shafts. The protective housing (26) and the locking part (13) are slidable axially together between a closed and an open position when the support shaft (5) is in the exchange position, the protective housing (26) and locking part (13) when in the open position exposing the profile pocket (15) for exchanging coupling shafts, the protective housing (26) and locking part (13) when in the closed position being disposed about the profile pocket (15).

21 Claims, 6 Drawing Sheets

BEARING ASSEMBLY FOR SHAFTS, PARTICULARLY EXPANDING SHAFTS OF WINDING MACHINES

The invention relates to a bearing assembly for shafts, particularly for expanding shafts of winding machines.

BACKGROUND OF THE INVENTION

For known bearing assemblies of this type, the locking part is constructed as a circular disk body, which is connected pivotably about a hinged axis with the receiving part and, in the closed position, has a direction perpendicular to the bearing axis. In a position of rotation of the receiving part, which is intended for exchanging shafts and in which the profile pocket is pointing upwards with its peripheral access opening and the hinged axis of the locking part is aligned horizontally, the locking part can be tilted into an open position in the direction of the bearing box, in which position the peripheral access opening of the profile pocket is completely open in the upwards direction. The end face of the bearing housing, opposite the locking part at the back, has a bevel, which permits the locking part to be swivelled into its open position into the position of rotation intended for exchanging shafts. At the same time, however, it forms a leading part, which folds the locking part back into its closed position, as soon as the receiving part leaves its position of rotation which is intended for exchanging shafts.

SUMMARY OF THE INVENTION

It is an object of the invention to provide a bearing assembly of the initially mentioned type, which is an improvement with respect to accident prevention.

The inventive bearing assembly peripherally encloses the parts of the receiving device, which revolve under operating conditions, with a stationary protective housing. Only when the receiving part is stationary in its position of rotation intended for exchanging shafts, can the protective housing be shifted into an exchange position, in which the locking part releases the profile pocket for exchanging shafts. At the same time, the locking part, transferred by the movement of the protective housing into its open position, remains shielded within the protective housing. By moving the protective housing back into its operating position, the bearing assembly is released to operate. Even if the shaft commences to operate inadvertently, the locking part and the protective housing are moved back automatically into their closed or operating position, even before the receiving part has carried out one quarter of a revolution.

Numerous further details and advantages arise out of the following description and drawings, in which two embodiments of the object of the invention are illustrated in greater detail.

DESCRIPTION OF THE PREFERRED EMBODIMENTS

The bearing assembly for shafts, illustrated in the drawing, is the one end of a part of a shaft bearing, which is assigned to a shaft is supported so that it can be exchanged and comprises two bearing assemblies that are mounted aligned and opposite one another on a machine frame.

Bearing assemblies for the exchangeable support of shafts are used primarily for the support of winding shafts, particularly cocking-lever shafts in winding machines, as used primarily for coiling and unwinding material sheets, films or foils of paper, plastic and/or metal.

The bearing assembly shown is constructed as a sliding bearing and comprises a flanged bearing box 1 with bushings 2, in which the actual bearing box 4 is supported so that it can be shifted axially and fixed by means of an adjusting spring 3a held by screws 3b. Sliding bearings of this type enable a shaft bearing to be adapted to different operating conditions within the range, in which they are designed to be shifted. Instead of the flanged bearing box 1, it is also possible to provide a vertical bearing box 1 (as in FIG. 5). It is also possible to construct the actual bearing box 4 itself directly as a vertical or flanged bearing box.

In the bearing box 4, a support shaft 5 is rotatably supported by way of a tapered roller bearing 6, which has a shaft journal with adjusting spring 7 projecting out of the bearing box 4. The support shaft 5, near its shaft journal, reaches through a housing cover 8, which is fastened by means of screws 9 to the bearing box 4 and sealed from the support shaft 5 by a shaft seal 10. A locking nut 11, which is screwed onto a section of the supporting shaft 5 that is provided with a thread, is braced with, in FIG. 1, the left side against the tapered roller bearing 6 and thus enables the supporting shaft 5 to be fixed in the bearing box 4.

At its end averted from the shaft journal, the supporting shaft 5 is provided with a receiving apparatus, which can be released and locked, for an end of a shaft, which faces this receiving apparatus. The latter comprises a receiving part 12, which is firmly connected with the support shaft, and a locking part 13, which revolves with the receiving part and can be shifted relative to it. The receiving part 12 is bolted by means of screws 14 with the inner end face of the support shaft 5 and accordingly is connected with the support shaft 5 in such a manner that it can be exchanged. It comprises a profile pocket 15 with an axial and a peripheral access opening 16 and 17 respectively for a coupling part of matching shape, which forms a counter-profile at the end of a shaft, as well as an axially aligned recess 18 at its periphery, the front part of which intersects with the profile pocket 15 and, in the region of intersection, defines the peripheral access opening 17. The region of the axial opening of the profile pocket 15 is covered by a cam-shaped disk 19, which is of great importance for axial displacements and is bolted with screws 20 to the adjacent end of the receiving part 12.

The locking part 13 is constructed as a sleeve valve, which is braced on the receiving part 12 so that it cannot rotate, but can be shifted axially between an open and a closed position. The sleeve valve is provided with an extension 21, which engages inwards the recess 18 of the receiving part 12. This extension 21 couples the locking part 13 and the receiving part 12 in the direction of rotation and, in the closed position of the locking part 13, closes the peripheral access opening 17 to the profile pocket 15, as can be inferred from FIG. 1. Moreover, the extension 21 is connected exchangeably with its locking part 13 over an adjusting spring 22 and screws 22'. The exchangeability of the parts 12, 19 and 21 enables the receiving apparatus to be adapted to different profiles of coupling ends of accommodating shafts.

On its end face facing the bearing box 4, the locking part 13 is provided with a cam part in the form of axially projecting, essentially triangular cams 23, which are distributed non-uniformly over the periphery and the inner and outer surfaces of which in each case lie on a cylinder surface. Correspondingly triangular leading recesses 24, which are hollowed out in the end face of an annular leading part 25 that is disposed in stationary fashion on the bearing box 4, faces the cams 23 of the locking part 13. The leading recesses 24 are, moreover, disposed in such a manner and assigned to the cams 23 in such a manner, that the cams 23 can be introduced into the leading recesses 24 in only one position of rotation of the receiving part 12, this position of rotation being intended for exchanging shafts. With this, the possibility arises of transferring the locking part 13 into the open position.

The receiving apparatus 12, 13 is surrounded by a protective housing 26. In the embodiments of FIGS. 1 to 4, this protective housing 24 is constructed in one piece and essentially has an L-shaped cross section. The protective housing 26 is supported with the cylindrical inner surface of its long leg on the cylindrical outer surface of the bearing box 4. The part of the bearing box 4, embraced by the protective housing 26 in the closed position of the locking part 13, is formed by a ring part 27, which, held by screws 28 is attached to the end face of the bearing box 4 and continues the bearing box.

The locking part 13 is supported in the protective housing 26 over a bearing 29, which, at the same time as a cam, couples the locking part 13 and the protective housing 26 for axial motions. The bearing 29 between protective housing 26 and locking part 13 is disposed in the area before the end face of the short leg of the protective housing 26 and is held in position relative to the protective housing 26 by a front, ring-shaped cover part 30, which is fastened by means of screws 31 in an axial annular recess in the short leg of the protective housing 26. The cover part 30 wraps around a half ring 32 and a snap ring 33, which engage a groove in the outside of the locking part 13 and form a component of the coupling of the locking part 13 and the protective housing 26 for axial motions.

In the ring part 27 of the bearing box 4, three similarly acting cam tracks 34, which have a helical course and each of which takes up a cam follower that is disposed on the protective housing 26, are distributed over the periphery. This cam follower is formed by the inner end of a threaded mandrel 35, by means of which a radial handle 36 is connected with the protective housing 26.

Figure 1:
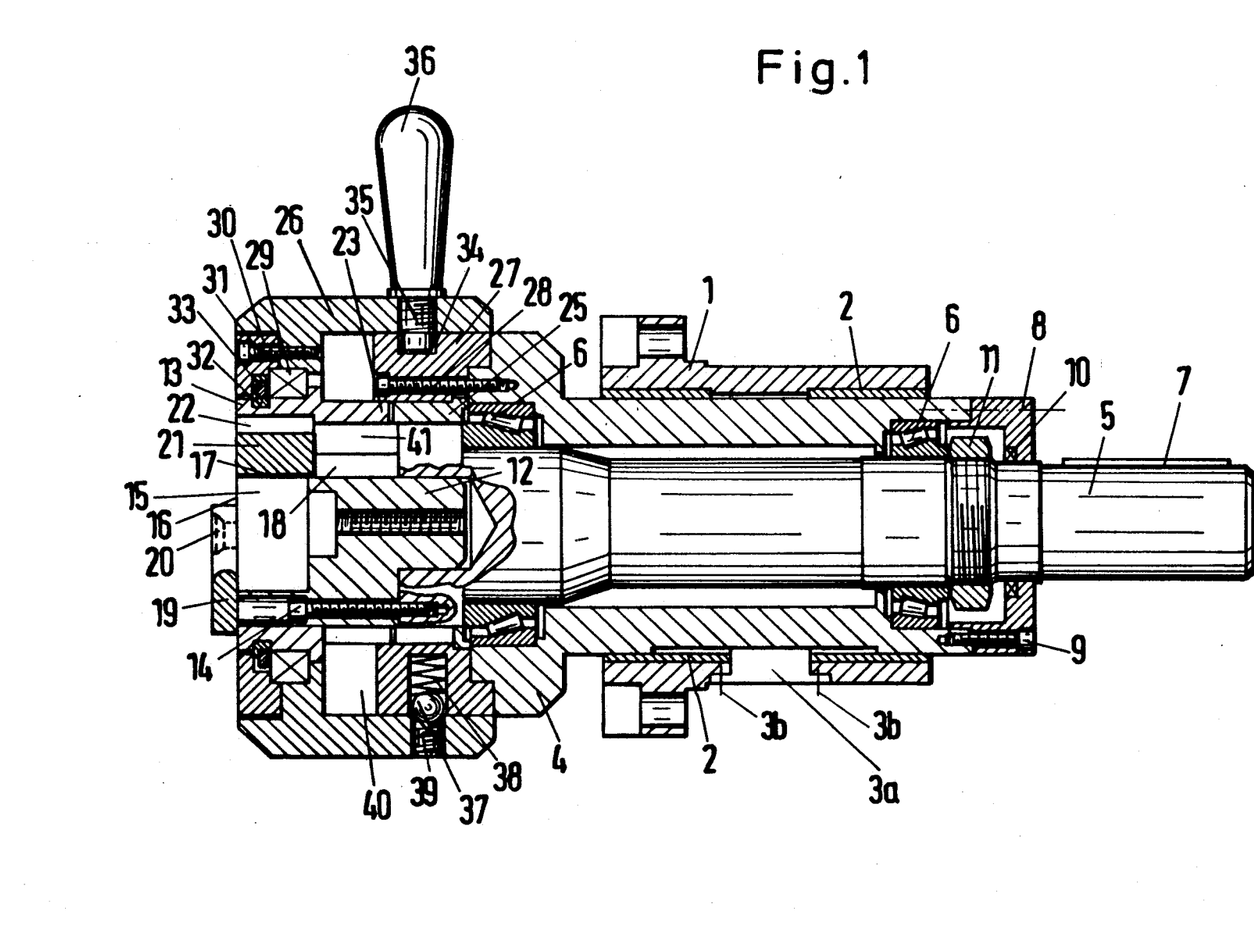
FIG. 1 shows an axial section through a bearing assembly of the invention in the hand-operated version in the operating position of the parts.
Figure 2:
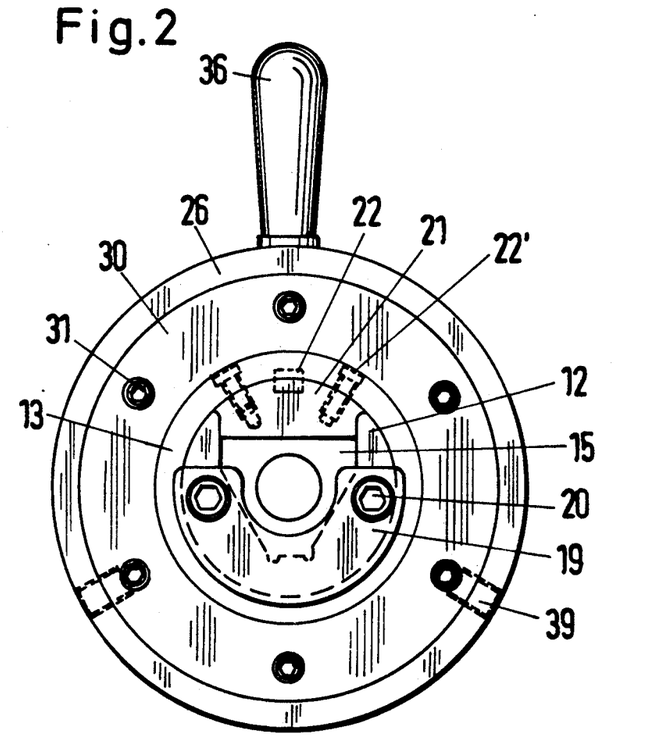
FIG. 2 shows an end face view of FIG. 1.
Figure 3:
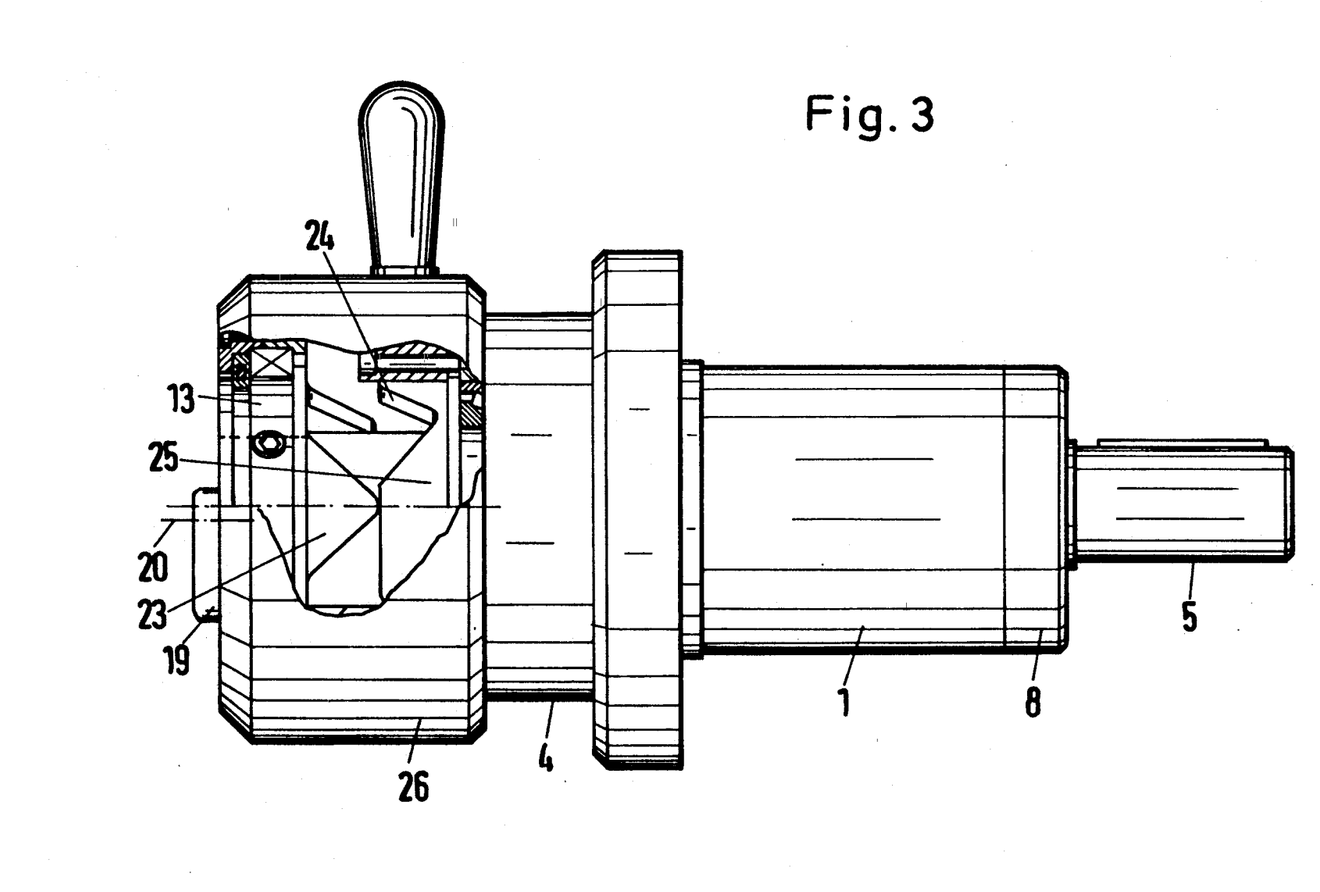
FIG. 3 shows a side view, which is partially broken open, of the bearing assembly of FIG. 1 in the operating position of the parts.
Figure 4:
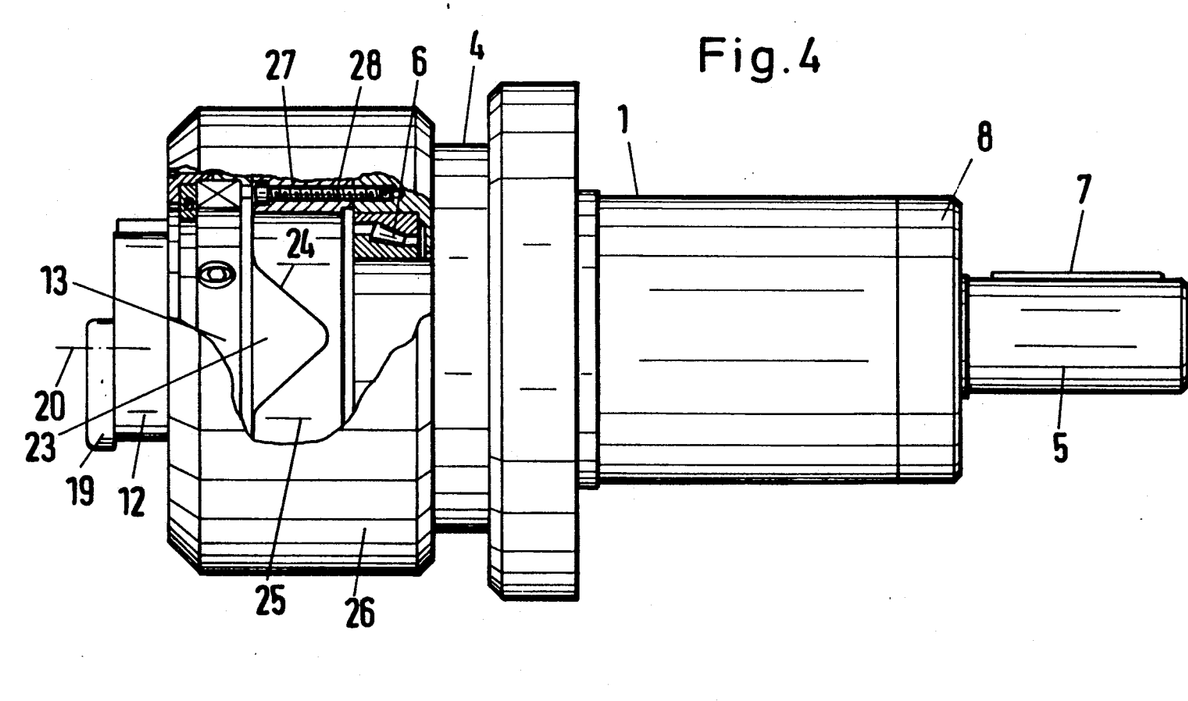
FIG. 4 shows a view similar to that of FIG. 3, to illustrate the parts in the exchange position.

In the operating position illustrated in FIGS. 1 and 3, the protective housing 26 is arrested relative to the bearing box 4 and the ring part 27 by means of spring catch, which comprises a detent ball 37, a spring 38 that tends to press the detent ball 37 radially towards the outside and an index notch at the inner end of a setscrew 39. Parts 37, 38 are disposed on the ring part 27 and the setscrew 39 is disposed on the protective housing 26.

When the bearing assembly is in the operating position of its parts, as shown in FIG. 1, in which a shaft, which is not shown, is fixed with its one end in the profile pocket 15 (not shown), the protective housing 26 shields the receiving apparatus 12, 13 towards the outside and, because of its stationary state, forms an effective protection against injuries to persons busying themselves in the area of the bearing assembly.

To exchange a shaft that is supported at its two ends by a bearing assembly as shown in FIG. 1, the driving mechanism, acting on the shaft journal of the supporting shaft 5, is switched off and the receiving part 12, which is connected with the supporting shaft 5, is brought into a position of rotation previously determined for exchanging the shaft. In this position, the peripheral access opening 17 to the profile pocket 15 points upwards. The receiving parts 12 of the two bearing assemblies can also be aligned manually after the driving mechanism is switched off.

Due to the alignment of the receiving part 12 and, with this, of the locking part 13, cams 23 of the locking part 13 come to be aligned with and lie opposite to the leading recesses 24 of the stationary leading part 25, so that, when the protective housing 26 is swivelled by means of the hand lever 36, the protective housing 26 can carry out a movement axial to the bearing box 4, that is, to the right in FIG. 1. The protective housing 26 experiences this axial shift due to the action of the cam track 34 on the cam follower 35. As a result of the coupling of the protective housing 26 and the locking part 13 for axial motions, the protective housing 26, during its helical withdrawal motion, carries the locking part 13 along in an axial shifting motion. As a result, the locking part reaches the open position illustrated in FIG. 4. In this position, the profile pocket 15 lies open towards the top and is accessible over its peripheral access opening 17 for the removal and the introduction of the coupling end of a shaft. For carrying out the axial shift of the protective housing 26 and the locking part 13, a free space 40 is provided between the radial inner surface of the short leg of the protective housing 26 and the opposite end face of the ring part 27 of the bearing box 4 and the peripheral recess 18 in the locking part 13 also comprises a free space 41, which adjoins the back of the extension 21 and accommodates the extension 21 in the open position of the locking part 13.

After an exchange of shafts has been carried out, the protective housing 26 is swivelled back again by means of its handle 36 and, due to the action of the cam track 34, experiences an axial shift back into its operating position, as shown in FIG. 1. During this return motion, the protective housing 26 once again carries along the locking part 13 in an axial movement. By these means, the locking part 13 reaches its closed position.

If the protective housing 26 is not returned into the operating position before the driving mechanism, which acts on the driving journal of the support shaft(s) 5, is switched on, the locking part 13 is automatically caused to return to the closed position by the interaction of the leading part 25 and the cam part 23, since the leading recesses 24 exert with their wedge surfaces a thrust effect on the wedge surface of the cams 23 with the result, that the cams 23 are forced out of the leading recesses 24 and, as they leave the leading recesses 24, have transformed the locking part into its closed position. The bearing assembly therefore is fully operational once again, as soon as the receiving part 12 has moved a few degrees of angle out of its position of rotation, which is intended for the exchange of shafts.

Since the protective housing 26 constantly embraces and shields the locking part 13 and, even in the exchange position, the receiving part 12 is exposed only so far, that the profile pocket 15 just becomes accessible, the bearing assembly offers good protection against injuries, which are by no means out of the question with conventional bearing assemblies with a constantly exposed locking part.

Figure 5:
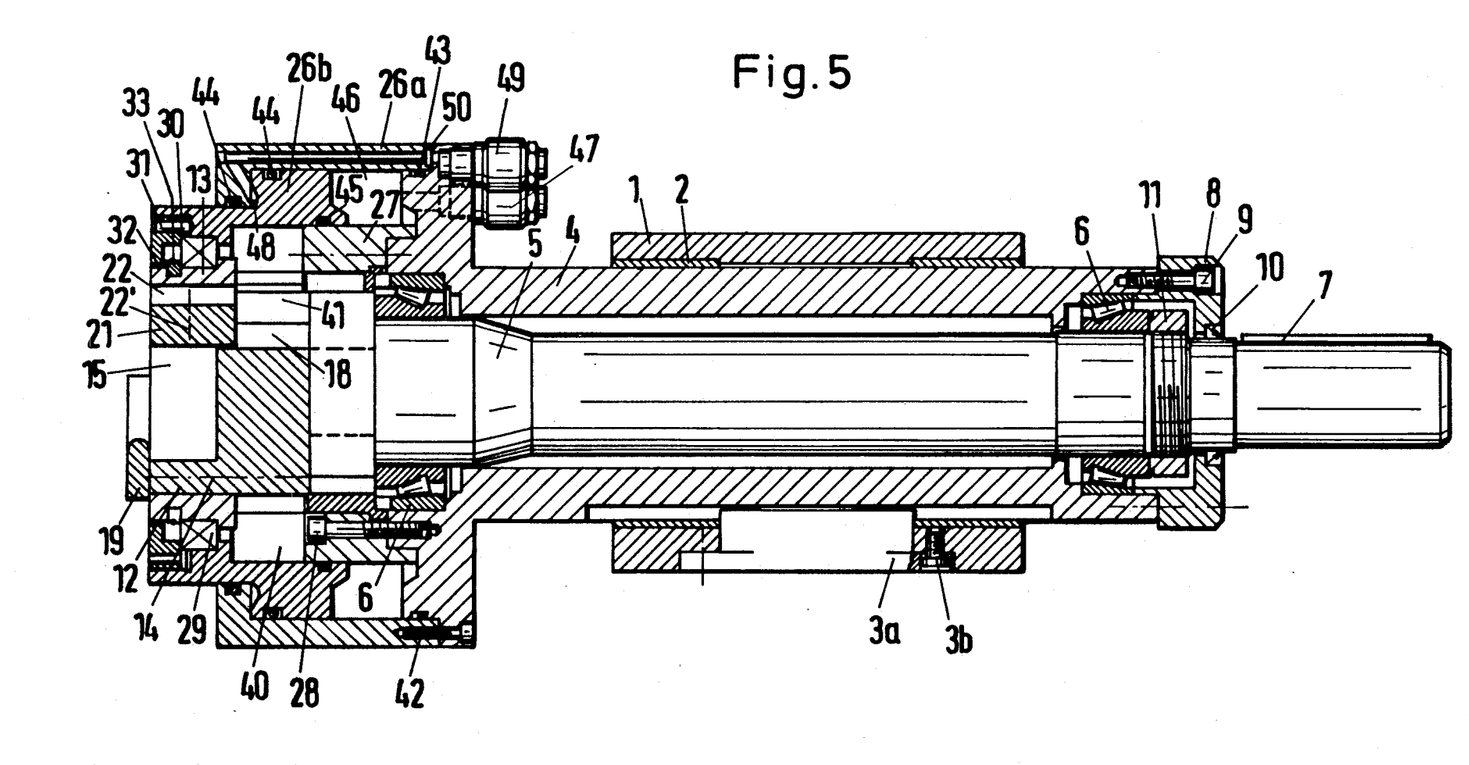
FIG. 5 shows an axial section, similar to that of FIG. 1, through a bearing assembly in a version with pressure medium driving mechanism.
Figure 6:
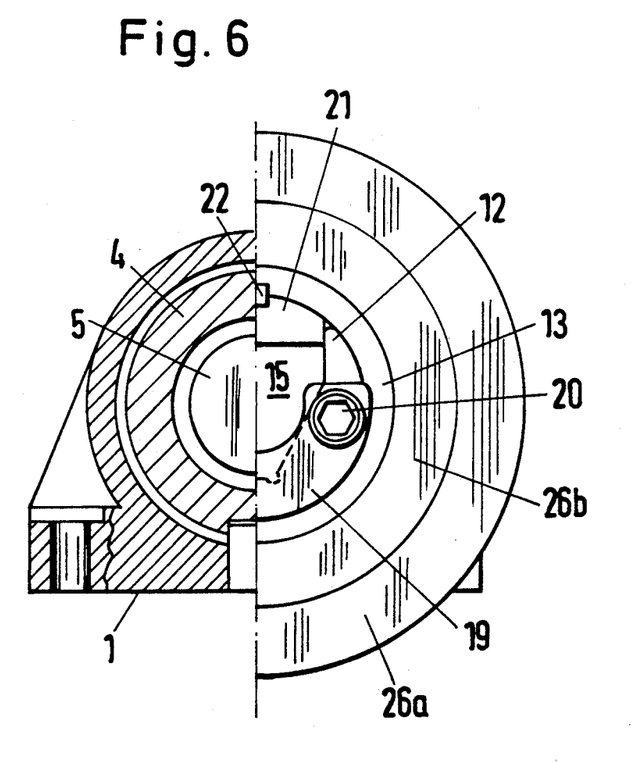
FIG. 6 shows an end view of the bearing assembly of FIG. 5.

The further embodiment shown in FIGS. 5 and 6 provides for a pressure medium driving mechanism, particularly a pneumatic driving mechanism, instead of the manual driving mechanism for transforming the bearing mechanism from the operating position to the exchanging position and for the reverse process. However, the basic construction of the bearing assembly of the invention is largely retained. Similar parts of the construction are therefore also provided with similar reference symbols.

Contrary to the embodiment of FIGS. 1 to 4, the protective housing is composed of two parts, 26a and 26b, the outer part 26a of which is firmly connected by screws 42 to the bearing housing 4 and the inner part 26b of which is supported so that it can be shifted axially. The outer part 26a of the protective housing forms the cylinder part and the inner part 26b of the protective housing forms the piston part of the pressure medium driving mechanism. The outer part 26a is sealed through seals 43 and 44 from the bearing box 4 and the inner part 26b. The inner part 26b, in turn, is sealed by a seal 45 from the ring part 27 of the bearing box 4.

On its side facing the bearing box 4, the inner part 26b adjoins a cylinder space 46. When the latter is acted upon by the pressure medium over the pressure medium connection 47, the inner part 26b carries out a motion into the operating position shown in FIG. 5. On its side averted from the bearing box 4, the inner part 26b adjoins a cylinder space 48. When this cylinder space 48 is acted upon by the pressure medium over a pressure medium connection 49 and a connecting duct 50, which is passed through the outer part 26a, an axial shifting out of its operating position into an exchange position, which is displaced to the right in FIG. 1, is impressed on the inner part 26b. For the two motions, the inner part 26b carries along the locking part 13 out of its closed position, shown in FIG. 5, into its open position and the reverse. However, for the embodiment of FIG. 5, axial movements of the inner part 26b of the protective housing into the exchange position and of the locking part 13 into the open position can also be carried out only if the receiving part 12 once again is in its position of rotation, which is intended for the exchange of shafts and in which the profile pocket 15 is accessible over an upwardly pointing, peripheral access opening. However, as with the embodiment of FIGS. 1 to 4, it is sufficient if any region of the assigned leading recess 24 lies opposite the tip of the cam 23. The parts 23, 24 are then truly aligned as they mesh.

After shafts are exchanged, the inner part 26b of the protective housing is pushed back again axially into its operating position by action upon the cylinder space 46 as the cylinder space 48 is being vented. At the same time, the inner part 26b carries along the locking part 13 and transfers it into its closed position. Here also, in the event that the support shaft(s) 5 is driven before the receiving apparatus is closed, such a closing is forcibly brought about automatically in the first movement phase by the interaction of the parts 23, 25 in the manner already described.

I claim:

1. A bearing assembly for supporting a support shaft to which a coupling shaft is to be coupled, comprising a bearing box (4) rotatably supporting a support shaft (5), said support shaft (5) having a longitudinal end, a receiving part (12) having an inner end connected to said longitudinal end of said support shaft and an outer end provided with a profile pocket (15), said profile pocket (15) having an axial access opening (16) and a peripheral access opening (17) for receiving a coupling shaft to be coupled to said support shaft (5), a protective housing (26) rotatable and axially slidable on said bearing box (4), said protective housing (26) being disposed about said receiving part (12), a locking part (13) disposed between said receiving part (12) and said protective housing (26), said locking part (13) rotating with said receiving part (12) while being axially slidable on said receiving part (12), said protective housing (26) being axially slidable together with said locking part (13), said support shaft (5) having an exchange position to which said support shaft (5) is rotated to provide for exchanging coupling shafts, said protective housing (26) and said locking part (13) being slidable axially together between a closed and an open position when said support shaft (5) is in said exchange position, said protective housing (26) and locking part (13) when in said open position exposing said profile pocket (15) for exchanging coupling shafts, said protective housing (26) and locking part (13) when in said closed position being disposed about said profile pocket (15), said protective housing (26) and locking part (13) being disposed in said closed position during rotation of said support shaft, a first cam means (23) on said locking part (13), a second cam means (25) on said bearing box (4), said first and second cam means (23, 25) being engageable to move said protective housing (26) and said locking part (13) from said open position to said closed position when said support shaft (5) is rotated from said exchange position.

2. A bearing assembly according to claim 1, wherein said locking part (13) comprises a sleeve member which is disposed about said receiving part (12) to rotate with said receiving part (12), said sleeve member being axially slidable on said receiving part (12).

3. A bearing assembly according to claim 1, wherein said locking part (13) has an inner extension (21), said receiving part (12) having an axial recess (18), said recess (18) receiving said extension (21) to couple said locking part (13) to said receiving part (12) when said protective housing (26) and locking part (13) are in said open position, said extension (21) being disposed in said peripheral access opening (17) of said profile pocket (15) when said protective housing (26) and locking part (13) are in said closed position.

4. A bearing assembly according to claim 3 further comprising spring means (22) and fasteners (22') exchangeably mounting said extension (21) on said locking part (13).

5. A bearing assembly according to claim 3, wherein a free space (41) is provided radially outwardly of said recess (18) for accommodating said extension (21) when said protective housing (26) and locking part (13) are in said open position.

6. A bearing assembly according to claim 1, wherein said locking part (13) comprises a sleeve having an axial end, said first cam means (23) comprising substantially triangularly shaped projecting cams (23) disposed non-uniformly on said axial end.

7. A bearing assembly according to claim 6, wherein said first cam means have an inner surface and an outer surface, each of said inner and outer surface being part of a cylindrical surface.

8. A bearing assembly according to claim 6, wherein said second cam means (25) comprises substantially triangularly shaped recess cams (24) corresponding to said substantially triangularly shaped projecting cams (23), said projecting cams (23) being disposed in said recess cams (24) when said support shaft (5) is in said exchange position, said projecting cams (23) being moved out of said recess cams (24) when said support shaft (5) is rotated out of said exchange position.

9. A bearing assembly according to claim 1 further comprising bearing means (29) providing rotatable support between said protective housing (26) and said locking part (13), and means connecting said protective housing (26) and said locking part (13) such that said protective housing (26) and locking part (13) are axially moveable together.

10. A bearing assembly according to claim 9, wherein said protective housing (26) comprises a cylindrical member having an inner projecting part such that said cylindrical member has a generally L-shaped cross sectional configuration in which the long leg thereof is in the form of a cylinder having an inner cylindrical surface, said bearing box (4) having an outer cylindrical surface on which said inner cylindrical surface is supported.

11. A bearing assembly according to claim 10, wherein said inner projecting part of said cylindrical member constitutes the short leg of said L-shaped cross-sectional configuration, said bearing means (29) being disposed at the radial inner face of said inner projecting part.

12. A bearing assembly according to claim 11, wherein said bearing box (4) has an end face and said inner projecting part has an end face axially spaced from said bearing box end face to define a free space (40) having an axial length at least as large as the amount of axial travel of said protective housing (26) and locking part (13) when said protective housing (26) and locking part (13) move between their open and closed positions.

13. A bearing assembly according to claim 1, wherein said protective housing (26) has an inner cylindrical surface, said bearing box (4) having an outer cylindrical surface (27) which is received in said inner cylindrical surface, a cam track means (34) in said outer cylindrical surface (27) and a cam follower means (35) on said protective housing (26) engageable with said cam track means (34).

14. A bearing assembly according to claim 13, wherein said protective housing (26) has a handle means (36) for moving said protective housing (26).

15. A bearing assembly according to claim 14, wherein said handle means (36) has thread means threaded to said protective housing (26), said handle means (36) having an inner mandrel portion (35) which defines said cam follower means.

16. A bearing assembly according to claim 1, wherein said bearing box (4) comprises a first bearing box part which rotatably supports said support shaft (5), said first bearing box part having an end face, said bearing box (4) further comprising a ring part (27), and fastening means (28) fastening said ring part (27) to said end face of said first bearing box part.

17. A bearing assembly according to claim 1 further comprising biasing detent means (37, 38, 39) disposed between said protective housing (26) and said bearing box (4) for biasingly retaining said protective housing (26) in its closed position.

18. A bearing assembly according to claim 1 further comprising pressure medium driving means for moving said protective housing (26) between said closed and open positions.

19. A bearing assembly according to claim 18, wherein said pressure medium driving means comprises a protective housing which has an outer part (26a) and an inner part (26b), said outer part (26a) being connected to said bearing box (4), said inner part (26b) being coupled to said locking part (13), said inner part (26b) being slidably guided on said outer part (26a).

20. A bearing assembly according to claim 19, wherein said outer part (26a) forms a cylinder and said inner part (26b) forms a piston which is slidable in said cylinder as a pressure medium is applied to said cylinder by said pressure medium driving means.

21. A bearing assembly according to claim 20, wherein said cylinder and piston comprise a double-acting pressure medium driving mechanism.

* * * * *